United States Patent [19]

Ward, II

[11] Patent Number: 4,920,824

[45] Date of Patent: * May 1, 1990

[54] SLIP CLUTCH HANDLE FOR PARKING METER SYSTEM

[75] Inventor: Seth Ward, II, Little Rock, Ark.

[73] Assignee: POM Incorporated, Russellville, Ark.

[*] Notice: The portion of the term of this patent subsequent to Nov. 21, 2006 has been disclaimed.

[21] Appl. No.: 248,166

[22] Filed: Sep. 23, 1988

Related U.S. Application Data

[63] Continuation-in-part of Ser. No. 204,352, Jun. 9, 1988, Pat. No. 4,881,631.

[51] Int. Cl.$^5$ .......................... G05G 1/10; G04F 1/04
[52] U.S. Cl. ........................................ 74/553; 368/90; 194/350
[58] Field of Search ................. 74/528, 545, 553, 531; 464/36, 38, 39; 368/90; 70/422; 194/225–228, 350

[56] References Cited

U.S. PATENT DOCUMENTS

| | | |
|---|---|---|
| 1,516,152 | 11/1924 | Dumont . |
| 1,683,715 | 9/1928 | Erban . |
| 2,603,288 | 7/1952 | Sollenberger . |
| 3,082,643 | 3/1963 | Grassi et al. . |
| 3,486,325 | 12/1969 | Cochran ................................ 368/90 |
| 3,636,701 | 1/1972 | Lazarow ............................... 368/90 |
| 3,662,628 | 5/1972 | Schnepel . |
| 4,515,037 | 5/1985 | Block . |
| 4,571,111 | 2/1986 | Keogh . |
| 4,679,420 | 7/1987 | Yang . |

FOREIGN PATENT DOCUMENTS 502403 11/1954 Italy .

Primary Examiner—Rodney M. Lindsey
Assistant Examiner—F. Saether
Attorney, Agent, or Firm—Hill, Van Santen, Steadman & Simpson

[57] ABSTRACT

A parking meter actuator handle is provided with a clutch means comprising slip bearing members disposed between first and second relatively rotatable parts. The slip bearing members are pre-loaded in recesses in said second part to provide frictional engagement between the first and second parts. But excessive torque forces exerted upon the first part causes relative displacement between the first and second parts as said frictional force is overcome to protect the parking meter against vandalism.

1 Claim, 1 Drawing Sheet

U.S. Patent
May 1, 1990
4,920,824
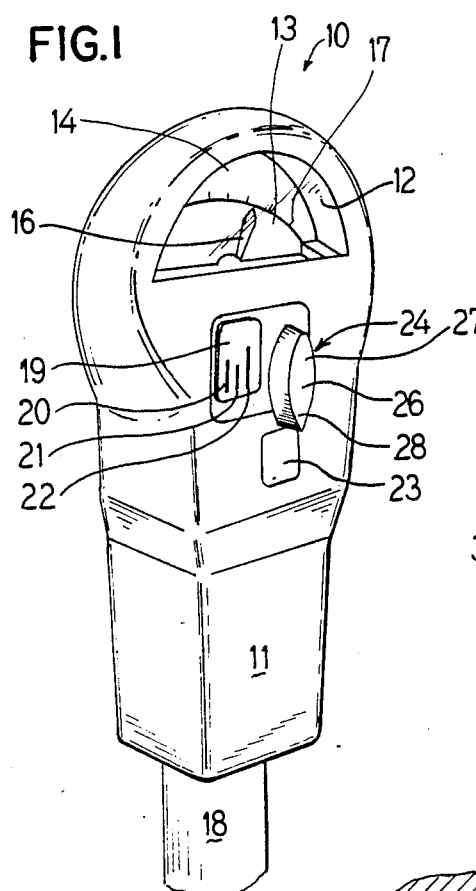
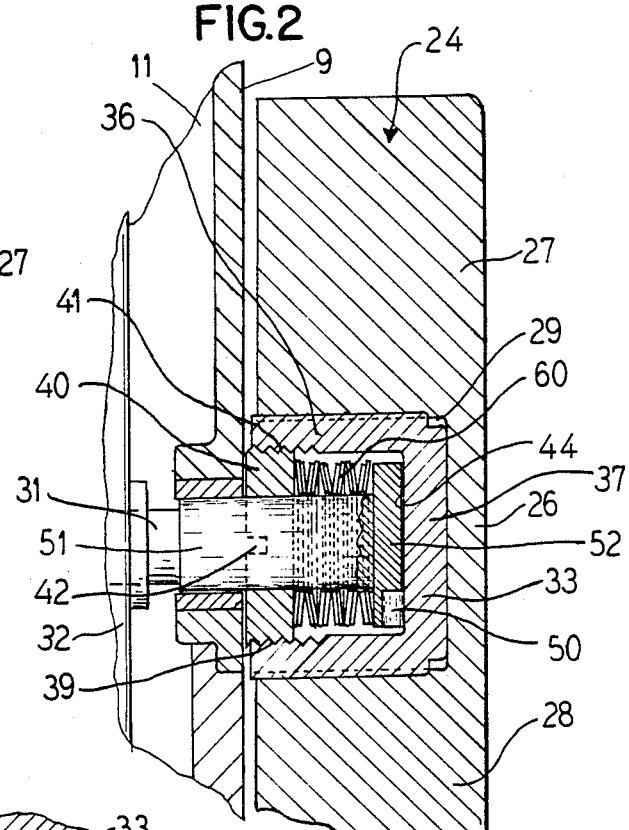
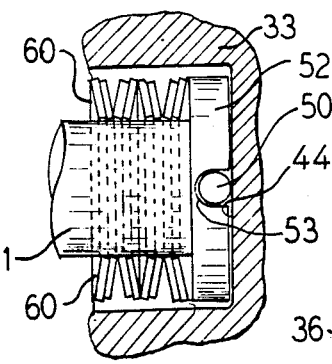
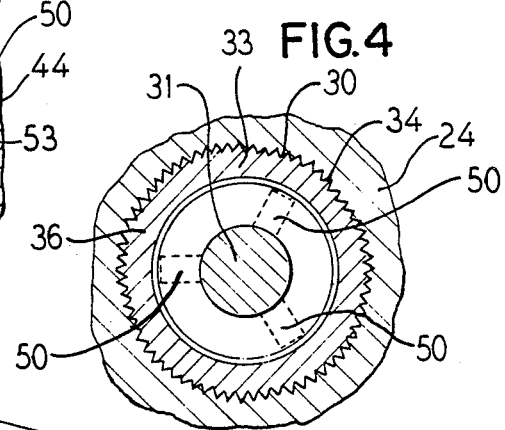
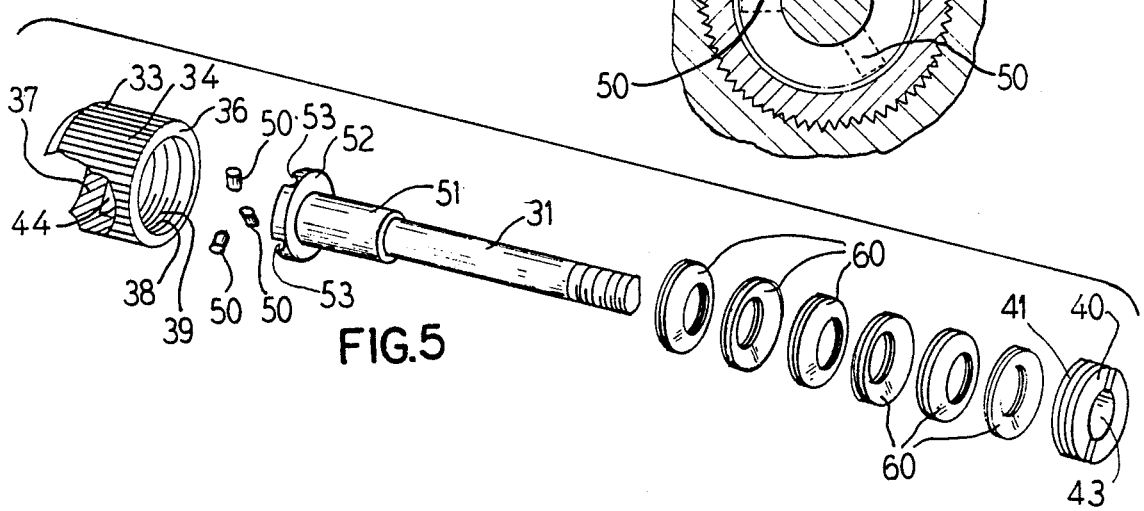

SLIP CLUTCH HANDLE FOR PARKING METER SYSTEM

BACKGROUND OF THE INVENTION

1. Field of the Invention

This is a continuation-in-part of U.S. Ser. No. 204,352, filed June 9, 1988. The invention relates generally to parking meters, and more specifically, to a clutch means for the actuating handle of an angularly displaceable type used in a parking meter.

2. The Prior Art

Parking meters are generally provided with an angularly displaceable actuating handle, for example, a handle that can be grasped in the fingers of a user and turned to set the time on the meter and actuate the other mechanisms within the container formed by the meter housing, thereby to initiate the action of the timer mechanisms that regulate the operation of the meter.

Parking meters are susceptible to extremely difficult environmental operating conditions, particularly at the hands of vandals who seek to thwart the effect and efficient operation of the meter, or who purposely inflict damage upon the mechanism. For example, it is not at all unusual for vandals to use mechanical aids of one kind or another for the purposes of applying excessive torques to the actuating handle in an effort to distort the operating mechanism of the meter or in an effort to actuate the operating mechanism of the meter without making a proper deposit of the necessary coinage.

In my prior application, Ser. No. 204,352, filed June 9, 1988, I disclose a break away means for preventing damage resulting from such vandalism. Another type of vandalism encountered by parking meters is so-called "banging time." In this type of vandalism, a coin is inserted into the meter and the handle associated therewith is rotated until the coin engages the pick-up lever that engages the timer mechanism. Once the coin engages the pick-up lever, the handle is struck through the remainder of its rotation with an appropriate object such as a hammer or piece of pipe. The inertia generated by this rotation can cause the meter to register up to double the proper time.

SUMMARY OF THE INVENTION

In accordance with principles of the present invention, a clutch or limited slip action is utilized as opposed to the previously employed breakover design of my prior application.

More specifically, the present invention uses a symmetrical handle because the orientation of the handle is unimportant. A clutch means is disposed between the first and second relatively rotatable parts, thereby, to effect a limited slip design. The clutch comprises a plurality of rollable cylinders loaded against a wall by spring washers such as Bellville spring washers.

DESCRIPTION OF THE DRAWINGS

FIG. 1 is a perspective view of a parking meter embodying a rotatable actuating handle embodying principles of the present invention;

FIG. 2 is a fragmentary cross-sectional view of the parking meter of FIG. 1 illustrating the actuating handle and its attachment to the meter;

FIG. 3 is a fragmentary, somewhat enlarged view of the rotatable actuating handle showing one of the detents of the slip clutch means in one position of alignment, wherein the parts of the handle assembly are locked in firm assembly with one another and in co-rotatable relationships;

FIG. 4 is a fragmentary cross-sectional view taken along the line IV—IV of FIG. 2; and FIG. 5 is an exploded view showing additional details of the construction of the clutch means of the present invention.

DETAILED DESCRIPTION OF THE PRESENTLY PREFERRED EMBODIMENT

The parking meter 10 embodying the principles of the present invention is illustrated in FIG. 1. The parking meter 10 comprises a housing 11 having a window 12 covered with a transparent enclosure such as glass or plastic 13 and through which may be viewed a calibrated time dial 14 across which moves an indicator arm or arrow 16 over an array of indicia 17 calibrated in time increments to show the amount of time remaining for which the user has paid the necessary stipend.

The housing 11 is mounted on a post or stanchion 18 and has a coin deposit fascia 19 mounted on a retaining plate 9 in which a plurality of coin slots 20, 21, and 22 are disposed so that coins of different denominations may be deposited in the meter 10 depending on the needs of the user. A coin return chute is shown at 23. An actuating handle in accordance with the principles of the present invention is shown generally at 24, the details of which are more particularly shown in the cross-sectional view of FIG. 2.

Referring now to FIGS. 2-5, it can be seen that, unlike my prior application, the actuating handle 24 is completely symmetrical so that orientation of the handle is not a factor in the operation of the meter. An enlarged central hub portion 26 has two symmetrically reduced, radially formed arm portions 27 and 28. The actuating handle 24 may conveniently comprise a dicast part made of an appropriate alloy that lends itself to dicasting.

In accordance with the principles of the present invention, a clutch means is provided between the handle part 24 and a shaft part 31 that is adapted to be connected to a point of utilization, namely, an operating mechanism 32 of the parking meter.

More specifically, the clutch means comprises a cylindrical cup shaped receptor element shown generally at 33 and comprising a cup shaped member of hardened steel which is knurled on its outer peripheral surface as at 34, thereby to permit a press fit of the receptor 33 into the recess 29 so that the knurling on the external surface of the receptor shown at 34 will cooperate with the knurling 30 on the inner surface of the recess 29 and locking the receptor and the receptor 33 and the handle 24 in firm assembly with one another so that they will co-rotate.

The cup shaped receptor has a central axis with longitudinal side walls 36 which terminate in an end wall 37 intersecting the axis. Unlike the device of my prior application, the wall 37 has an unbroken continuous smooth radial wall forming an engagement surface 44.

The side walls 36 of the receptor 33 circumscribe a recess 38, the inner surface of which is threaded as at 39 to receive an externally threaded cap 40 having screw threads 41 on its outer peripheral surface. The end wall of the cap 40 is slotted as at 42, thereby to cooperate with a tool for screw threading of the cap 40 into the receptor 33. An axially center hole 43 is provided in the cap to pass the end of the shaft part 31.

The shaft part 31 has a radially enlarged hub portion 51 having on the end thereof, a radially outwardly extending flange 52 of a discrete thickness so that the flange 52 may be formed with a set of three recesses 53 which receive and captivate three slip bearings 50. The slip bearings 50 are cylindrically shaped and sized and configured to be received in the recess 53, but which are adapted to rollably engage the unbroken wall surface 44 of the wall 37.

As is particularly shown in FIG. 5, there is a loading means provided for biasing and loading the flange 52 and the slip bearings 50 in frictional engagement against the surface 44 of the end wall 37 in the receptor 33. Instead of using all wave springs as in my prior application, loading means can comprise a preloaded spring washers such as a plurality of Bellville spring washers 60. The spring washers 60 are bottomed against the flange 52 and are engaged against the end wall of the cap 40. The spring washers 60 also serve to limit the axial movement of the slip bearings 50 in the slots or recesses 53 formed in the flange 52.

By turning the cap 40 into the threaded assembly with the receptor 33, the loading means provided by the spring washers 60 will bias and engage the slip bearings 50 in the recesses 53 with such a frictional engagement force that normally applied torque on the actuating handle 24 will rotatably drive the shaft part 31 for operation of the actuating mechanism 32 in a normal mode. However, if a banging action is applied to the actuating handle 24, the frictional engagement forces between the slip bearings 50 and the camming surface 44 will be overcome, and the bearings 50 will roll to provide a slipping or clutching action as they ride on the engagement surface 44. The actuating handle 24 will rotate relative to the shaft part 31 until the torque applied thereto is sufficiently small so that the biasing action of the spring washers 60 overcomes the tendency for the slip bearings 50 to roll. At that time, the actuating handle 24 is again instantly conditioned for normal operation of the parking meter.

It can be appreciated that the actuating handle 24 can be in any rotated position relative to the shaft part 31 whenever the receptor 33 and slip bearings 50 are engaged so as to cause corotation between the handle 24 and shaft on part 31. Thus, the handle arm portions 27 and 28 are symmetrically formed as the orientations of same are unimportant.

There is thus provided a slip clutch means which safeguards the parking meter against the application of so-called banging torques on the actuating handle 24 in an effort to defeat the objectives of the parking meter 10.

Although minor modifications might be made by a person skilled in the art, I wish to embody within the scope of the patent warranted herein, all such modifications as reasonably and properly come within the scope of my contributions to the art.

I claim as my invention:

1. In a parking meter, a rotatable non-oriented symmetrical actuating handle,
    a cylindrical cup shaped receptor in said handle having a end wall intersecting the central axis thereof and a side wall extending axially and longitudinally with respect to said central axis;
    a shaft having a flange on one end thereof positioned in said receptor adjacent said end wall, said flange having a plurality of slotted recesses formed therein spaced radially from said longitudinal central axis,
        said handle comprising a fully symmetrical first part adapted to be rotatably actuated by the hands of a user from any position in a 360 degree orientation,
        said shaft comprising a second part adapted to be connected to an operative mechanism of a parking meter; and
    clutch slip action means between the first and second parts preloaded to be co-rotatable under normal operating conditions from any position of relative orientation but being selectively yieldable to abnormal banging torque forces to protect the operating mechanism against vandalism which clutch slip action means comprises:
    a substantially flat radial engagement surface formed by said end wall intersecting the central axis thereof;
    said shaft and said flange on said second part being angularly displaceable around said axis;
    a plurality of slip bearing members each comprising a cylinder disposed between said first and second parts and received in respective ones of said recesses in said flange which are sized and shaped to retain said slip bearing members for angular displacement in unison with said first part, but allowing limited axial displacement; and
    axial loading means comprising a plurality of spring washers bottomed against said flange to provide frictional engagement between said first and second parts at said engagement surface and said slip bearing members when a torque force less than a predetermined threshold is applied to said first part and displaceable in response to abnormal banging torque forces applied to said first part to accommodate temporary slipping or rolling of said slip bearing members on said engagement surface until said abnormal banging torque force subsides, said actuating handle being operable to facilitate acceptance of a coin immediately after removal of said abnormal banging torque force.

* * * * *